(12) United States Patent
Erickson et al.

(10) Patent No.: US 11,856,177 B2
(45) Date of Patent: Dec. 26, 2023

(54) ROW-INDEPENDENT OLIGONUCLEOTIDE SYNTHESIS

(71) Applicant: SIERRA BIOSYSTEMS, INC., Sonora, CA (US)

(72) Inventors: Bruce Erickson, Sonora, CA (US); Marshall Henry, Sonora, CA (US)

( * ) Notice: Subject to any disclaimer, the term of this patent is extended or adjusted under 35 U.S.C. 154(b) by 0 days.

(21) Appl. No.: 18/118,032

(22) Filed: Mar. 6, 2023

(65) Prior Publication Data

US 2023/0209033 A1    Jun. 29, 2023

Related U.S. Application Data

(63) Continuation of application No. 17/250,642, filed as application No. PCT/US2019/046802 on Aug. 16, 2019, now Pat. No. 11,596,919.

(60) Provisional application No. 62/719,487, filed on Aug. 17, 2018.

(51) Int. Cl.
*H04N 13/207* (2018.01)
*H04N 13/254* (2018.01)
*B01J 19/00* (2006.01)

(52) U.S. Cl.
CPC ........ *H04N 13/207* (2018.05); *B01J 19/0046* (2013.01); *H04N 13/254* (2018.05); *B01J 2219/00313* (2013.01); *B01J 2219/00409* (2013.01); *B01J 2219/00477* (2013.01)

(58) Field of Classification Search
CPC .... B01J 19/00; B01J 19/0046; B01J 2219/00; B01J 2219/00274; B01J 2219/00277; B01J 2219/00279; B01J 2219/00306; B01J 2219/00313; B01J 2219/00351–00409; B01J 2219/00477; H04N 13/00; H04N 13/20–207; H04N 13/254

See application file for complete search history.

(56) References Cited

U.S. PATENT DOCUMENTS

| | | | |
|---|---|---|---|
| 6,277,332 B1 * | 8/2001 | Sucholeiki | C07K 1/042 422/65 |
| 6,436,350 B1 * | 8/2002 | Stanchfield | B01J 19/0046 422/131 |
| 2012/0085415 A1 * | 4/2012 | Bailey | B01L 3/502 422/551 |

* cited by examiner

*Primary Examiner* — Natasha E Young
(74) *Attorney, Agent, or Firm* — Sherrie Flynn; Aisha Otori; COLEMAN & HOROWITT LLP

(57) ABSTRACT

Apparatuses and a method for plate-based oligonucleotide synthesis are disclosed. In one example, an apparatus used in oligonucleotide synthesis includes a machined block to receive a commercially-available synthesis plate. A keeper is used to apply pressure to the commercially-available synthesis plate, and a sealing element is used to seal the commercially-available synthesis plate to the machined block. Other methods and apparatuses are disclosed.

20 Claims, 13 Drawing Sheets

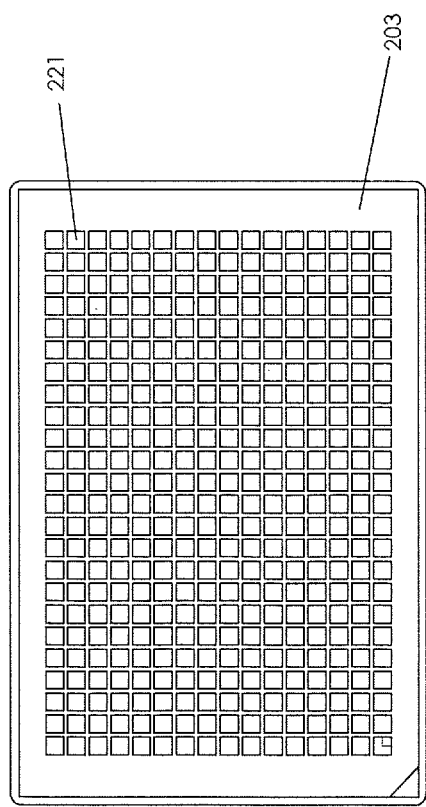
FIG. 2B
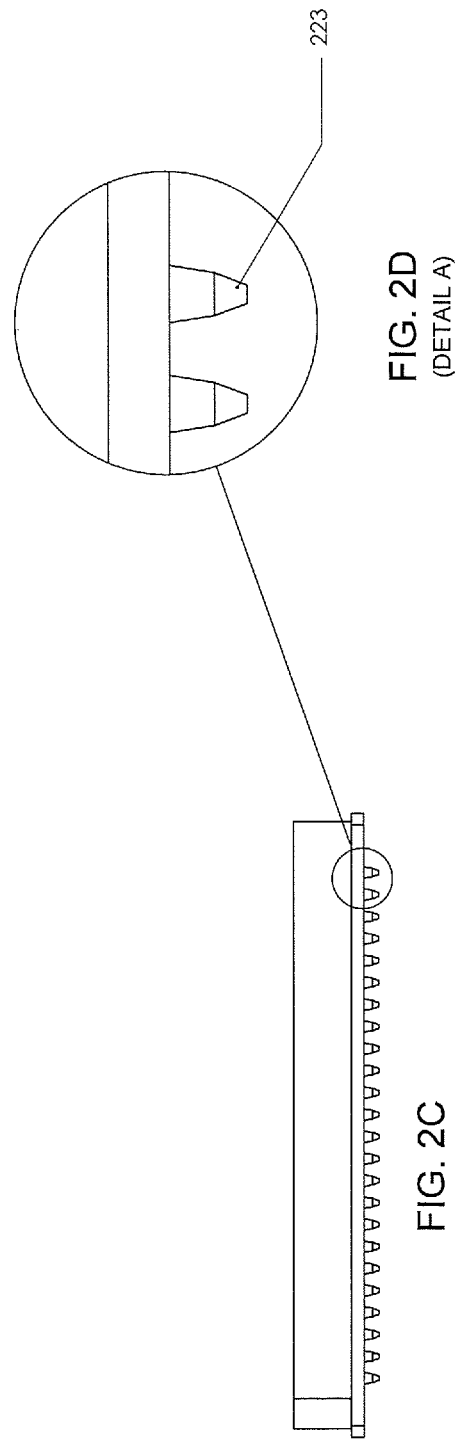
FIG. 2C
FIG. 2D
(DETAIL A)

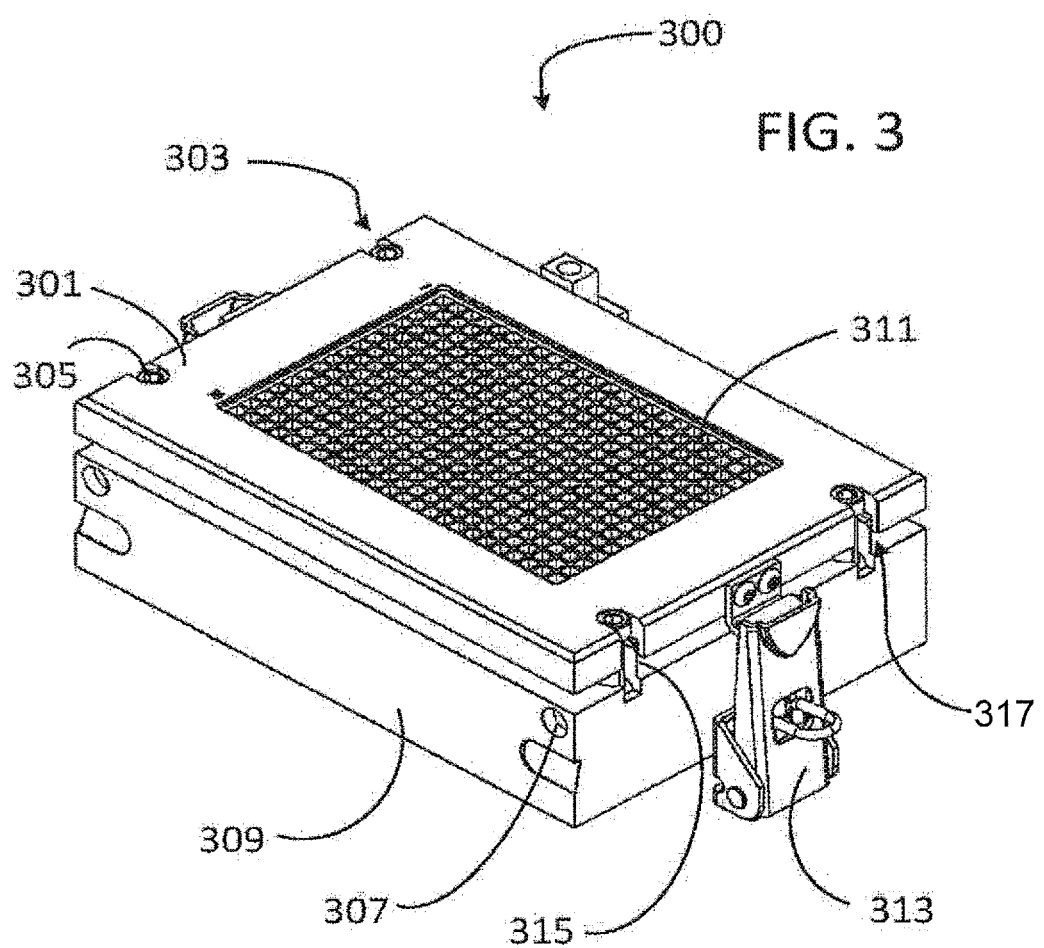

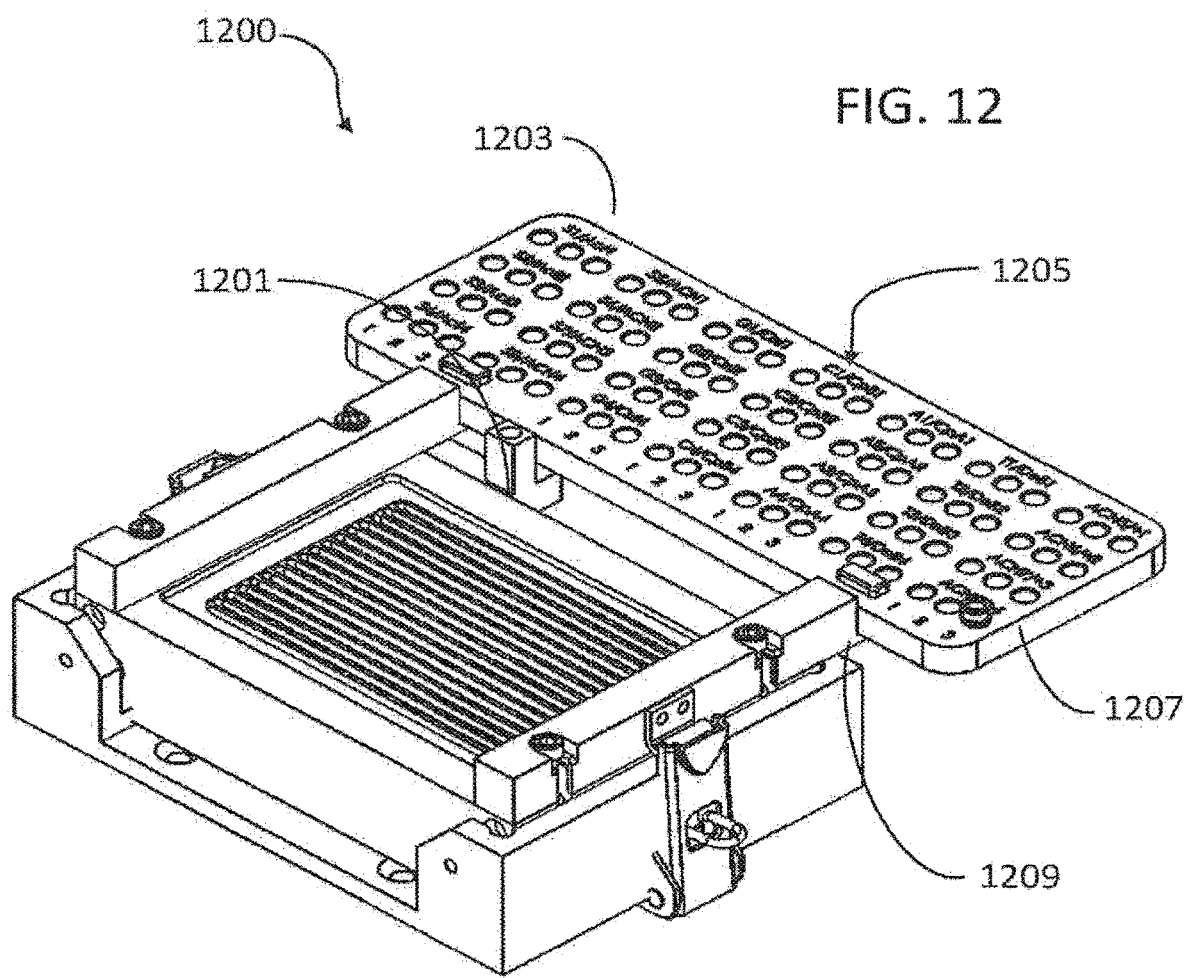

ROW-INDEPENDENT OLIGONUCLEOTIDE SYNTHESIS

CLAIM OF PRIORITY

This patent application claims priority to and is a continuation of U.S. patent application Ser. No. 17/250,642, filed Feb. 15, 2021, which will issue as U.S. Pat. No. 11,596,919 on Mar. 7, 2023, which, pursuant to 35 U.S.C. § 371, is a U.S. National Phase application of and claims priority to PCT/US2019/046802, now WO2020037194, filed Aug. 16, 2019, which claims priority pursuant to 35 U.S.C. § 119(e) to U.S. Provisional Application Ser. No. 62/719,487, filed Aug. 17, 2018. The text and contents of each of these patent applications are hereby incorporated into this application by reference as though fully set forth herein.

TECHNOLOGY FIELD

The disclosed subject matter is generally related to the field of biotechnology. More specifically, the disclosed subject matter is related to the de novo synthesis of DNA, RNA, synthons, and full genes—frequently generically referred to as oligonucleotide synthesis.

BACKGROUND

Since the release of the seminal paper on tRNA synthesis in 1972 by H. G. Khorana et al., the field of gene synthesis has experienced steady growth. With its use in generating novel therapeutics and biomaterials, academic and industrial researchers frequently require more exogenous DNA sequences than a standard laboratory can produce.

To fill this need, automated oligonucleotide synthesis systems have been developed to generate oligonucleotides in hours, in quantities and varieties that a single laboratory technician would have otherwise needed weeks or months to complete. As the demand for synthetic oligonucleotides increases, these high-throughput systems must experience continual refinement to meet the needs of the marketplace.

The information described in this section is provided to offer the skilled artisan a context for the following disclosed subject matter and should not be considered as admitted prior art.

SUMMARY

Devices, mechanisms, and design elements are disclosed herein that reduce reagent consumption, increase throughput, and shorten cycle times on an oligonucleotide synthesis apparatus. In an embodiment, a mechanism for these improvements includes, in various embodiments, a machined block that can receive commercially-available synthesis plates and synthesize unique genetic material in each well, while allowing self-contained rows of each of the plates to retain full autonomy with respect to one another. This autonomy not only increases the versatility of the plates, but also allows a user to conduct synthesis in a continuum or gradient, thereby decreasing cycle times. Various embodiments presented herein offer an end user processes for generating oligonucleotides at a significantly reduced cost with significantly higher production rates.

In an embodiment, the disclosed subject matter includes an apparatus used for oligonucleotide synthesis. The apparatus includes a machined block configured to receive a commercially-available synthesis plate, a keeper to apply pressure to the commercially-available synthesis plate, and a sealing element to seal the commercially-available synthesis plate to the machined block.

BRIEF DESCRIPTION OF THE DRAWINGS

FIG. 2B shows a top view of the synthesis plate of FIG. 2A;

FIG. 2C shows a side view of the synthesis plate of FIG. 2A;

FIG. 2D shows an enlarged view of waste tips of the synthesis plate of FIG. 2A;

FIG. 3 shows an exemplary embodiment of an assembled draining apparatus in accordance with various embodiments of the disclosed subject matter;

FIG. 12 shows an exemplary embodiment of a calibration apparatus that may be used with various ones of the embodiments disclosed herein.

Figure 1:
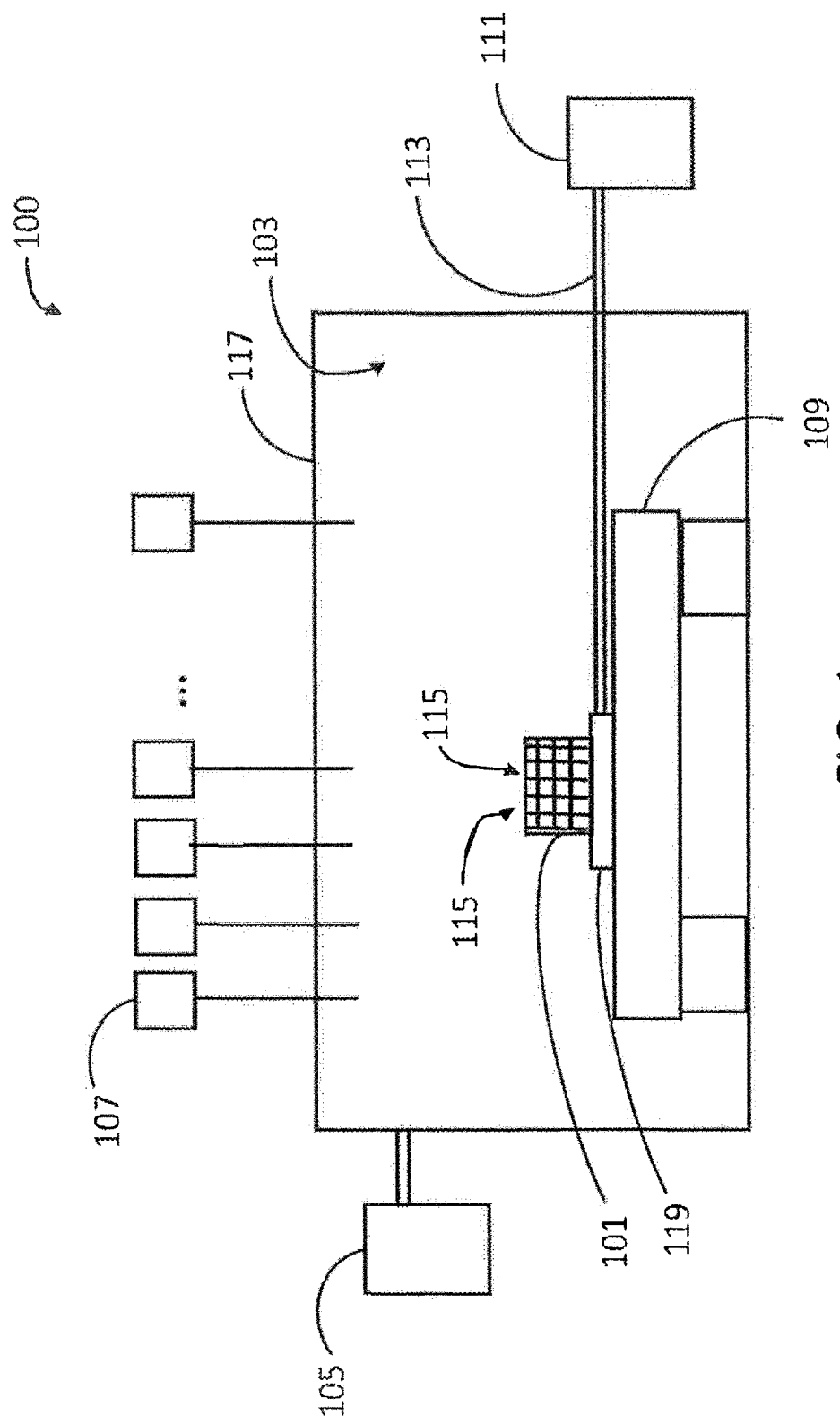
FIG. 1 shows a high-level, exemplary embodiment of a row-independent oligonucleotide (RIOS) system.

A person of ordinary skill in the art will recognize that various dimensions and other units provided herein, including those dimensions and other units provided in the appended figures, are given merely to provide a context in which the disclosed subject matter may readily be understood. However, the dimensions and other units can be varied as needed. Therefore, the dimensions and other physical units should not be considered as being limiting; the skilled artisan, upon reading and understanding the disclosure provided herein, will recognize how to modify various ones of the dimensions and other units as needed for a given application.

DETAILED DESCRIPTION

Despite the potential for variability and speed offered in plate-based creation of DNA, conventional synthesis has not taken this approach. Instead, individual columns have been the tool-of-choice for synthesizing oligonucleotides. The use of individual columns has been used for a variety of reasons, including:

1) The excess reagents required for plate-based synthesis compromise the cost benefits. Drainage of a plate typically requires that the entirety of the plate be drained at once, meaning that to achieve full expulsion of used material (e.g., waste), a plate's wells must all be filled evenly so as to achieve even drainage. In practice, this requirement for even filling within the prior art plays out as a user having to fill the unused wells of a plate with reagent only so that the used wells may conduct a quality synthesis. The reagents used to fill the excess wells in this process are therefore often wasted;

2) The time spent beginning synthesis on the first well and ending on the last well has economic consequences as well as chemical consequences. If a plate is conducting synthesis on all wells, the time after the first well has completed synthesis and is not draining is effectively time wasted. Whereas a synthesis run in singular columns may have the benefit of continuing its own synthesis despite an adjacent column's status, a plate's wells are dependent on each other in that the first well cannot drain until the last well can drain. Furthermore, the reagents used in oligonucleotide synthesis are corrosive enough to degrade a nascent DNA strand itself if left for too long. The excessive wait times are often exploited by the more aggressive chemicals involved, leading to a decline in the final yield of a plate's synthesis; and 3) To mitigate the time constraints and other issues outlined above, attempts have been made to provide valves for every position on the plate so that each may start and finish synchronously. Although this technique has proven to increase oligonucleotide yields, the costs involved to include this increased number of valves prices the machines out of the budgets of most laboratories. In cases where labs can afford these machines, the physical space required to accommodate such a machine often does not justify the system's presence.

The apparatus described herein facilitates improvements in plate-based DNA synthesis by resolving at least the issues noted above. It should be noted that the various embodiments disclosed herein will use an example intended for use with a 384-well plate. However, upon reading and understanding the disclosed subject matter, a person of ordinary skill in the art with recognize that the disclosed subject matter may be expanded or scaled-down to seat plates of any size of orientation, though typically in, for example, configurations of 96, 384, or 1536 wells as described herein merely for ease in understanding the various embodiments described.

When inspecting the issues surrounding DNA synthesis in plates, a person of ordinary skill in the art will recognize that many or all problems arise from one crucial flaw of prior art systems: DNA synthesis machines treating a synthesis plate as a single vehicle for DNA synthesis. Instead, the DNA synthesis machine should have an ability to treat the synthesis plate as though each row in a plurality of rows and/or well contained within the synthesis plate is independent of the other rows or wells. An immediate problem in the prior art designs lies in the pressure requirements needed to operate one well or row and how the user is to implement that pressure without simultaneously affecting the other wells and rows. Also, to accomplish the various prior art implementations with consideration of susceptibility of adjacent ones of the rows regarding contamination to and from one another.

Various embodiments of the apparatuses and methods disclosed herein offer solutions in the form of, for example, an air-tight seal between rows and/or wells of one or more synthesis plates as described in detail below.

For example, FIG. 1 shows a high-level, exemplary embodiment of a row-independent oligonucleotide (RIOS) system 100. Because of the multiplicity of chemicals used in a reaction cycle of DNA, reagents are used and then allowed to pass through so that new reagents can be added to continue the synthesis cycle. To accomplish the treatment of the reagents, a synthesis plate 101 is inserted into a chamber 103 as shown in FIG. 1. The chamber 103 fills with inert gas from a pressurized gas-source 105 to displace any oxygen that would not be conducive to DNA synthesis. In embodiments, the pressurized gas-source 105 provides from about 5 kPa to about 100 kPa of pressure to the chamber 103. Once the chamber 103 is filled with inert gas, individual wells 115 within the synthesis plate 101 begin to receive reagents for synthesis.

The reagents are dispensed from, for example, a ceiling 117 of the chamber 103 through a set of solenoid valves 107. The skilled artisan will recognize that other types of valves, known in the art, may be utilized as well. In one embodiment, the set of solenoid valves 107 is stationary. Consequently, the synthesis plate 101 moves underneath the set of solenoid valves 107 to ensure that the dispensed reagents are delivered to the correct wells within the synthesis plate 101. In another embodiment, the synthesis plate 101 is stationary and the set of solenoid valves 107 may be moved with reference to the synthesis plate 101. In still other embodiments, each of the synthesis plate 101 and the set of solenoid valves 107 can be moved relative to one another. For ease of understanding the various embodiments of the disclosed subject matter, the remainder of the disclosure is based on an assumption that the synthesis plate 101 moves underneath a stationary version of the set of solenoid valves 107.

Movement of the synthesis plate 101 is performed by seating the synthesis plate 101 on a movement stage 109 that can carry out precise and repeatable movement patterns, controllable by a control device or mechanism (not shown). The control device may be, for example, a microcontroller or other processor-based device (e.g., a laptop or tablet computer). The movement stage 109 can be, for example, an x-y stage, an R-θ stage, or other type of positioning system known in the art. Once the synthesis plate 101 has received the assigned reagents, and a pre-defined reaction time has occurred, the used reagents (now referred to as waste) are purged from the RIOS system 100. The waste is purged by opening one or more solenoid valves 111 that are coupled to each row of the synthesis plate 101 via one or more tubes 113. An opening of the one or more solenoid valves 111 allows the inert gas in the pressurized chamber to be purged to the outside environment, which is at a lower pressure than the chamber 103. Since the only obstacle between the pressurized gas in the chamber 103 and an ambient pressure of the outside environment is the waste, the waste is carried out via the one or more tubes 113 with the purged gas. Finally, the one or more solenoid valves 111 are closed, an interior pressure of the chamber 103 of the RIOS system 100 is restored, and the synthesis plate 101 (for example, in a given row or well) is ready to undergo another reagent delivery.

One feature of the RIOS system 100 described above is a drain block 119 that couples the synthesis plate 101 to the one or more tubes 113. The apparatus that accomplishes the purging operation described above with reference to row-independent oligonucleotide synthesis is now described in more detail with reference to FIG. 2A-2D.

Figure 2A:
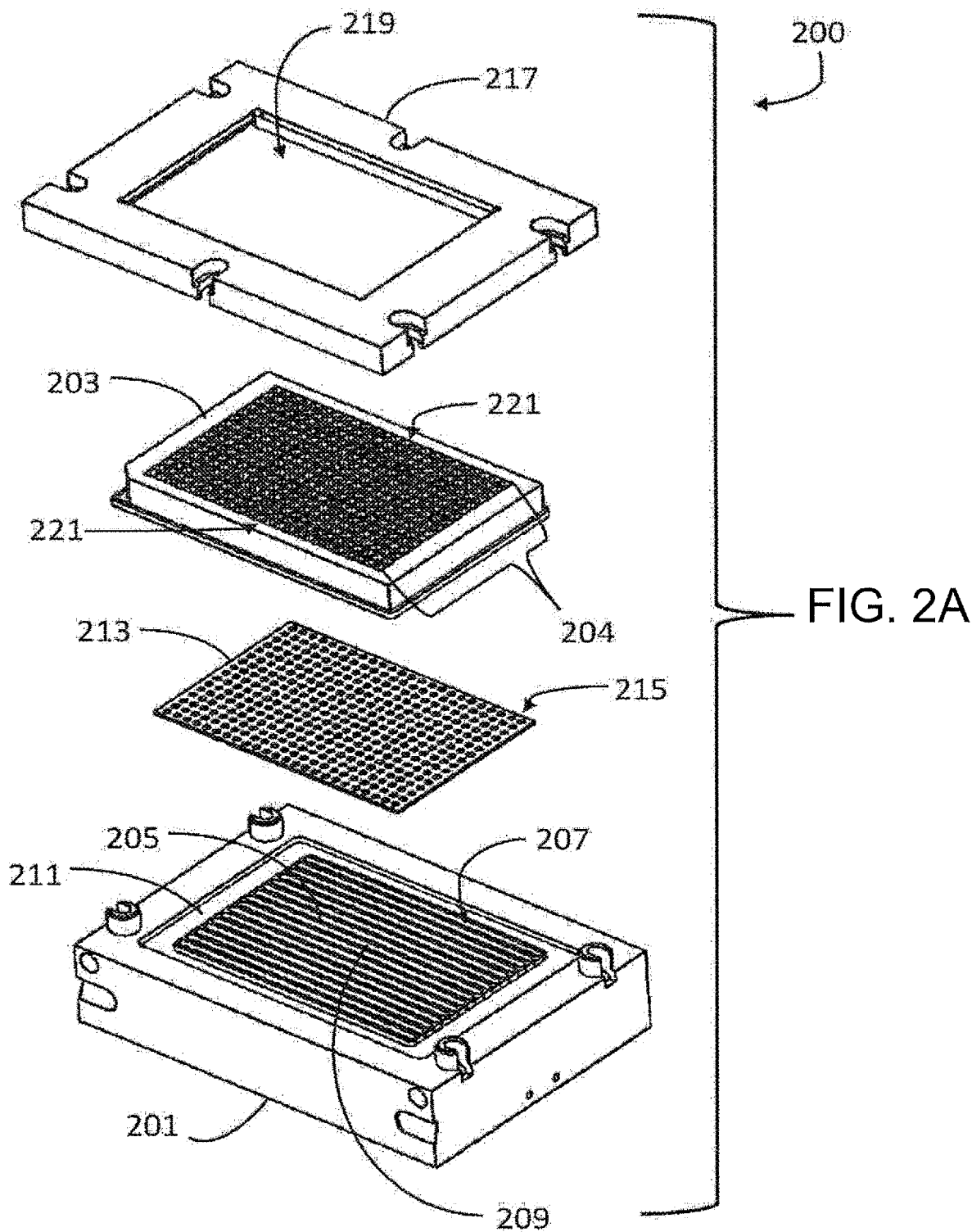
FIG. 2A shows an exemplary embodiment of a broken-out, disassembled draining apparatus comprising a drain block, a sealing element, a synthesis plate, and a keeper in accordance with various embodiments of the disclosed subject matter.

FIG. 2A shows an exemplary embodiment of a broken-out, disassembled apparatus 200 comprising a drain block 201, a sealing element 209, a synthesis plate 203, and a keeper 217 in accordance with various embodiments of the disclosed subject matter. Consequently, FIG. 2A shows the disassembled apparatus 200 for draining the synthesis plate 203 with reference to each of a set of rows 204 within the synthesis plate 203. As described below, the synthesis plate 203 may be any of a variety of commercially-available synthesis plates.

The drain block 201 is configured to accept, for example, the synthesis plate 203 in such a way that rows 204 in the synthesis plate 203 can undergo drainage via pressure, as described above, and in such a way that these rows 204 can each experience a separate drainage without affecting any adjacent or remaining ones of the rows 204. Each of the rows contains a number of individual wells 221.

In a specific exemplary embodiment, the synthesis plate 203 comprises a commercially-available plate consisting of 384 wells (e.g., 384 of the individual wells 221). As the 384-well plate is generally divided into 16 rows of 24 wells each, the drain block 201, in this specific exemplary embodiment, is designed with a receiving feature 205 that has 16 elongated openings 207 (one of the elongated openings 207 for each of the 16 rows in this example) for waste tips of each of the individual wells 221 to fall into. For example, in one specific exemplary embodiment, given that the wells of all commercially-available 384-well plates are spaced about 4.5 mm apart from center-to-center, the elongated openings 207 in the drain block 201 are cut to slightly over about 108 mm long.

The bottom of the elongated opening 207 is dipped (e.g., a machined or otherwise formed depression) from about 20 mm to about 40 mm or more so the waste may flow to a singular point: an opening leading to the back of the drain block 201. The dips of all the elongated openings 207 are designed in such a way that they do not conflict with each other. In this embodiment, the lowest point of one of the elongated openings 207 is not the lowest point of another, using the lowest point as an outlet so that the elongated openings 207 do not reach the same outlet.

In another embodiment, the outlets could be parallel to the elongated openings 207, thereby needing no variance in the lowest point as each of the elongated openings 207 since they would no longer run perpendicular to the outlets. Therefore, in any embodiment, the elongated openings 207 of the receiving feature 205 of the drain block 201 remains an independent vessel until a final termination at the back of the machine.

In a specific exemplary embodiment, the sealing element 209 of the drain block 201 is a double-barreled or domed curve. The sealing element 209 is, for example, a full-crown radius of about 2.54 m (approximately 100.02 inches) applied to the receiving feature 205 after being machined to an even height. The surrounding area is a recess 211 shaped to accommodate the synthesis plate 203. The recess 211 is cut further than the sealing element 209 by about 2.54 mm (approximately 0.100 inches). These mechanical features of the drain block 201 allow for a substantially even seal across the entire back of the synthesis plate 203. Pressure from the synthesis plate 203, applied towards the center of the receiving feature 205, with a gradual fall-off towards the outer edges of the receiving feature 205, allows for the gasket 213 to seat the synthesis plate 203 substrate gap-free onto the drain block 201. The radius stated above was determined in previous iterations of the drain block 201 wherein no curvature was applied to the back of the synthesis plate 203. In that iteration, no seal was formed in the center of the synthesis plate 203, though the edges experienced a slight resistance to alterations in surrounding pressures.

In an embodiment, the drain block 201 is machined out of Type-6061 aluminum and type-2 hard-anodized to prevent against waste-caused corrosion. However, a person of ordinary skill in the art, upon reading and understanding the disclosure provided herein, will recognize that materials other than aluminum may be used. For example, the drain block 201 may be machined from stainless steel or a number of other types of metallic or dielectric materials (e.g., aluminum oxide) depending on a use, cost, machining chars of the material, and other factors known to a skilled artisan.

With continuing reference to FIG. 2A, and as shown, the gasket 213 is placed between the synthesis plate 203 and the drain block 201. The gasket 213 is cut with a set of holes 215, enough so that the, for example, 384 waste tips (see e.g., waste tips 223 of FIG. 2D), located on the bottom of the synthesis plate 203, can fit into the 384-complementary set of holes 215. In this embodiment, the tips 223 on the back of the synthesis plate 203 are, for example, conical. The largest diameter on the waste tip measures slightly over about 2.54 mm (approximately 0.100"), therefore the set of holes 215 are cut to a tolerance of about 0.127 mm (approximately 0.005") less than 2.54 mm (approximately 0.100") so that each individual hole of the set of holes 215 may grip onto the waste tip 223. The gasket 213 is cut to accommodate the full surface area available on the back of most plates, measuring about 110.7 mm (approximately 4.36 inches) long by about 73.4 mm (approximately 2.89 inches) wide. The gasket 213 has a thickness of about 3.175 mm (approximately 0.125 inches). However, a person of ordinary skill in the art will recognize that a thickness of the gasket 213 may be varied depending upon physical chars of the gasket 213, such as a durometer of the material used to form the gasket 213.

In a specific exemplary embodiment, the material selected for the gasket 213 was a 10A neoprene rubber (or another natural or synthetic rubber or similar flexible material) coated with a light film of grease. In one specific exemplary embodiment, the grease used was a fluorocarbon-ether polymer with the chemical formula $F-(CF(CF_3)-CF_2-O)_n-CF_2CF_3$. This grease was chosen due to its inert properties and high load capacity. A dry, grease-less gasket may or may not provide a sufficient seal between the rows 204 of the synthesis plate 203 above when coupled with the drain block 201 beneath in various scenarios.

A keeper 217 is used to apply pressure onto the synthesis plate 203 and form a seal between the synthesis plate 203 and the drain block 201. The downward pressure applied to the synthesis plate 203 by the keeper 217 is substantially even across all edges of the synthesis plate 203 so that the sealing element 209 on the drain block 201 underneath may apply an opposing force to the center of the synthesis plate 203, and that force reaches across the synthesis plate 203 as the seal is formed from the center out. This coupling of the keeper 217, the synthesis plate 203, the sealing element 209, and the drain block 201, allow a uniform seal to be achieved between all rows 204.

The top of the keeper 217 is machined or otherwise formed with a cut out 219 that keeps each row 204 unobstructed so that each of the individual wells 221 in each of the rows 204 may receive incoming reagents.

FIG. 2B shows a top view of the synthesis plate 203 in such a way that each of the individual wells 221 can be seen. FIG. 2C shows a side view of the synthesis plate 203, and FIG. 2D shows an enlarged view of waste tips 223 of the synthesis plate 203.

FIG. 3 shows an exemplary embodiment of an assembled draining apparatus 300 in accordance with various embodiments of the disclosed subject matter. Some of the parts shown may be similar or identical two corresponding parts of FIG. 2A. In an exemplary embodiment, to pull a keeper 301 down onto a synthesis plate 311, a set of slots 303 for, for example, 10-32 socket-head screws 305 have been cut into sides of the keeper 301. A skilled artisan will recognize that many types of mechanical fasteners or other types of chemical fasteners (e.g., adhesives) may be used in addition to the socket-head screws 305 or instead of the socket-head screws 305.

The socket-head screws 305 insert into respective ones of the set of slots 303 and find their receiving thread in a shaft 307 that rotates freely inside of a drain block 309 beneath. Though originally designed with six screw-positions (two on each end with two on opposite sides of the center), testing has found that as few as four screw-positions may be used (e.g., the two on each end) with a 384-well plate. Additionally, degrees and evenness of pressure are largely applied to the synthesis plate 311 may even be superfluous once the grease (described above) is applied. So long as the torque of each screw exceeds, for example, roughly about 2.71 N-m to about 4.07 N-m (approximately 2 ft-lbf to about 3 ft-lbf), the seal holds at all ends of the synthesis plate 311. This being the case, a set of standard clips 313, toggle switches, or other mechanisms known in the art may provide just as effective a seal.

The assembled draining apparatus 300 shows that the keeper 301 may also be machined to accept a number of stand-offs 315 on the drain block 309. The stand-offs 315 provides at least two functions:

(1) To prevent or minimize over-tightening of the synthesis plate 311 onto the drain block 309. The stand-offs 315 on the drain block 309 are machined to about 4.78 mm (approximately 0.188 inches) above the top of the drain block 309 and receiving holes 317 on the keeper 301 are machined so that the synthesis plate 311 is not torqued over about 9.1 kg (approximately 20 lbs.). This limited torqueing is to prevent permanent warping of the synthesis plate 311 (partially depending on a material from which the synthesis plate 311 is formed); and (2) To align the synthesis plate 311 properly onto the elongated openings 207 (see FIG. 2A). When the stand-offs 315 and the receiving holes 317 align, the synthesis plate 311 can be seated. When the stand-offs 315 and the receiving holes 317 are out of alignment, the synthesis plate 311 cannot be seated. This alignment precaution is a failsafe against a user entering a run of synthesis without waste tips of the synthesis plate 311 entering every elongated opening 207 (see FIG. 2A) of the drain block 309.

Though commercially-available ones of the synthesis plates 311 that are designed for synthesis are not widely produced, the complete apparatus has been tested with products from two primary distributers of such plates (e.g., Agilent Technologies, 5301 Stevens Creek Blvd, Santa Clara, California, USA; and Biocomma Limited, Ground Floor, Bldg. 12, Zhonghaixin Innovative Industrial Park, Ganli Six Rd, Buji St, Longgang District, Shenzhen, China) and has found success with each of the products of each company. Examples of such a plate is similar or identical to the synthesis plate 311 of FIG. 3 and the synthesis plate 203 of FIG. 2A-2C.

Figure 4:
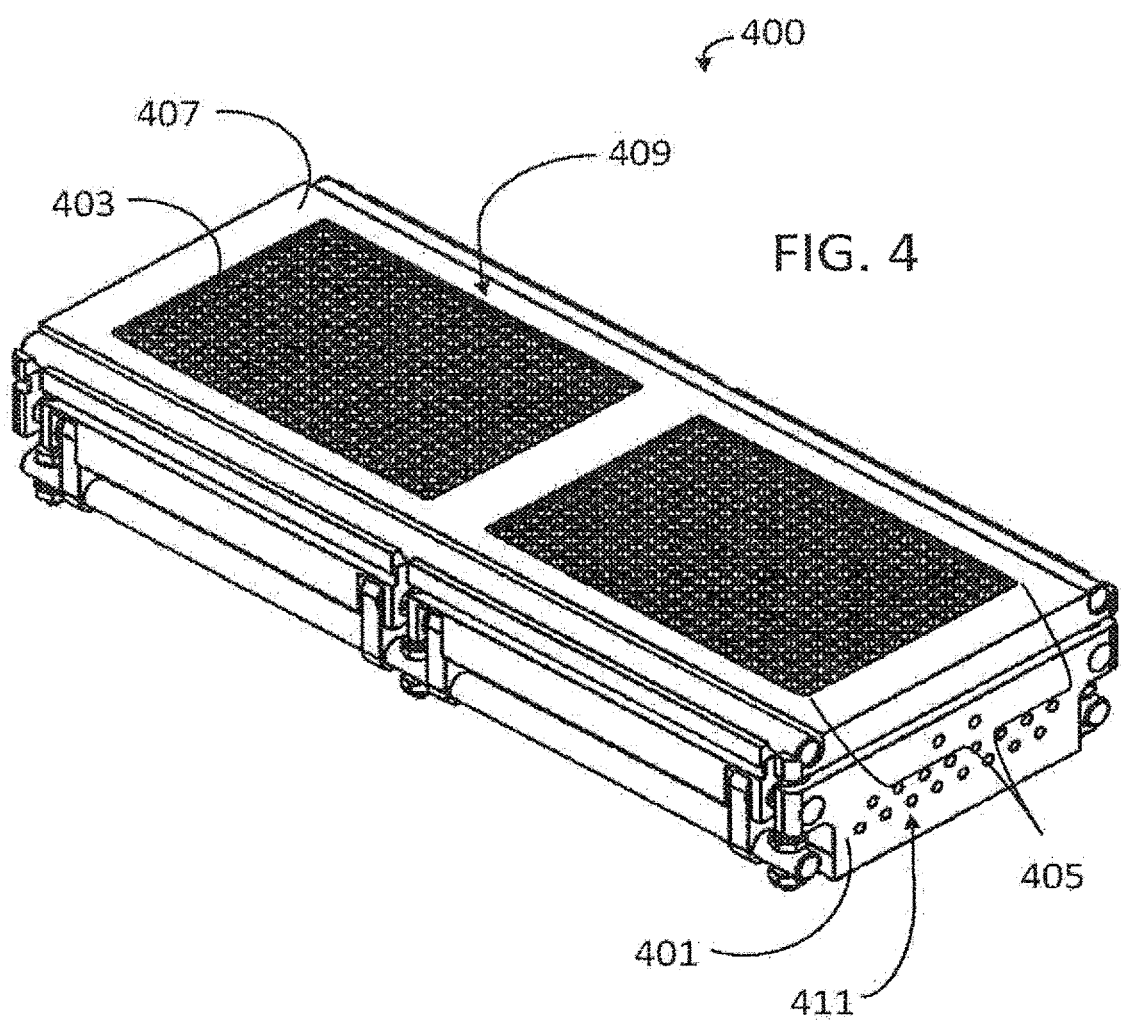
FIG. 4 shows an exemplary embodiment of an expanded apparatus in accordance with various embodiments of the disclosed subject matter.

The assembled draining apparatus 300 is fully expandable so that, in theory, several configurations of multiple synthesis plates can be accepted. FIG. 4 shows an exemplary embodiment of an expanded apparatus 400 in accordance with various embodiments of the disclosed subject matter Machining a drain block 401 with separate sets of sealing apparatuses and altering a set of waste outlets 411 to suit a number of available waste valves provides an effect similar to or the same as the drain block 309 of FIG. 3. However, the expanded apparatus 400 increases a work or production capacity by adding an additional synthesis plate 403.

To decide upon the appropriate drain configuration for the expanded apparatus 400, the number of waste valves needs to be considered. Then, a number of the additional synthesis plates 403 and a number of rows 405 per synthesis plate 403 are counted so that the number of waste valves is divided from the total number of the rows 405. This number determines the number of rows 405 that are to be drained by one valve. For example, if 16 valves were available to drain waste from two of the synthesis plates 403, with each of the synthesis plates 403 comprising 16 of the rows 405 each (totaling 32 rows), the expanded apparatus 400 is configured to drain the two rows (in this case, the first of both of the synthesis plates 403) simultaneously or substantially simultaneously, to achieve a purge equivalent or substantially equivalent to a single version of the synthesis plate 203, 311 system of FIGS. 2A and 3. In such a configuration, the keeper 407 is accordingly expanded so that it matches the length and width of an expanded version of the drain block 401. A set of cut outs 409 similar or identical to the cut out of a single version of the keeper 217 of FIG. 2A is cut so that each of the synthesis plates 403 is given its own individual aperture for receiving dispensed reagents. Gaskets and sealing elements (not shown in FIG. 4) remain the same or similar to the gaskets and sealing elements as previously described and be applied to each synthesis plate.

With concurrent reference again to FIG. 1, in an exemplary embodiment, the expanded apparatus 400 allows for additional ones of the synthesis plates 403 to be added in a configuration that is complimentary to an alignment of the dispensing tips located above the synthesis plates 101, on the ceiling 117 of the chamber 103. For example, if the same solvent was dispensed from tips aligned vertically, the synthesis plates 101 are aligned horizontally. This arrangement allows simultaneous firing of all aligned tips as the synthesis plates 101 move underneath. This arrangement also reduces or minimizes a need for movement in a vertical direction, thus reducing an overall synthesis time.

Figure 5:
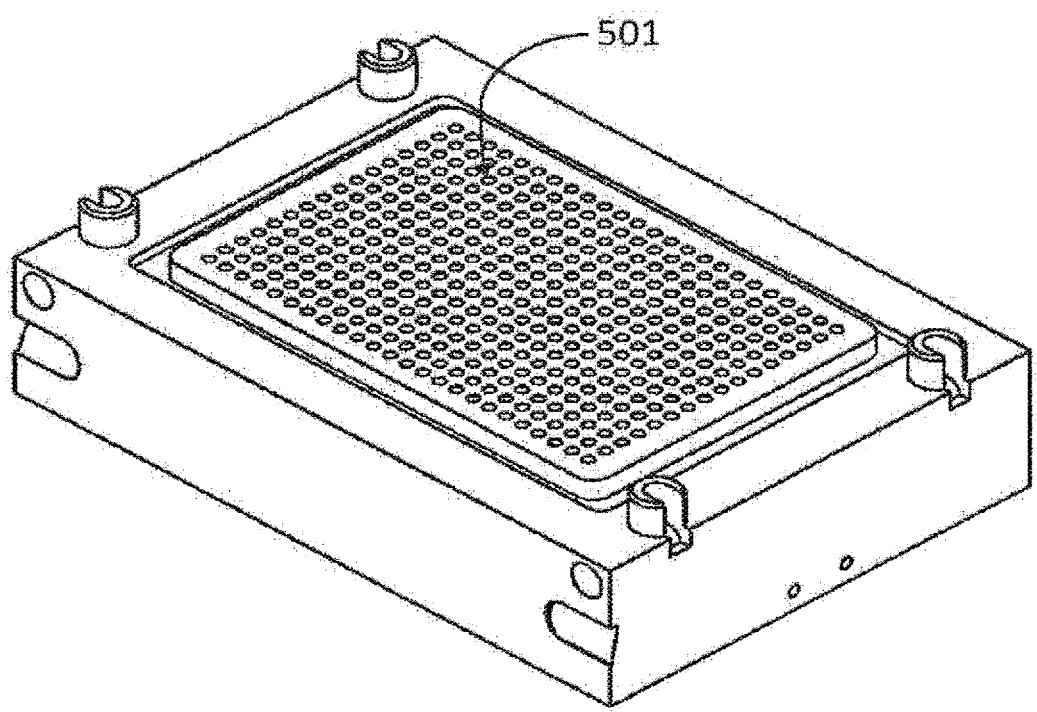
FIG. 5 an exemplary embodiment of a drain-hole plate in accordance with various embodiments of the disclosed subject matter.

FIG. 5 an exemplary embodiment of a drain-hole plate in accordance with various embodiments of the disclosed subject matter. With concurrent reference again to FIG. 2A, FIG. 5 is shown to include a single-well drain block 500 that allows creation of an individual synthesis cycle on each of the individual wells 221 on the synthesis plate 203. In this case, the elongated openings 207 in the existing format would instead be replaced with a series of drain holes 501. Supplementary O-rings (not shown) incorporated in each of the drain holes 501 may be used to create a seal therein. In a similar way to how the number of waste outlets 411 equals the number of rows 405 in FIG. 4 being drained substantially simultaneously, the single-well drain block 500 may use a monotonic (e.g., 1:1) relationship between the number of individual wells 221 in the synthesis plate 203 and the number of waste outlets coupled to the single-well drain block 500. The drain holes 501 in the block may be machined or otherwise formed so that their diameters (or other characteristic dimension) exceed the largest diameter (or other characteristic dimension) of the conical waste tip 223 (see FIG. 2D) on the bottom of the synthesis plate 203 of FIG. 2A-2C. Accounting for these alterations, the single-well drain block 500 can be used within various embodiments described above (e.g., the RIOS) for autonomous synthesis on each of the individual wells 221 of the synthesis plate 203.

Figure 6:
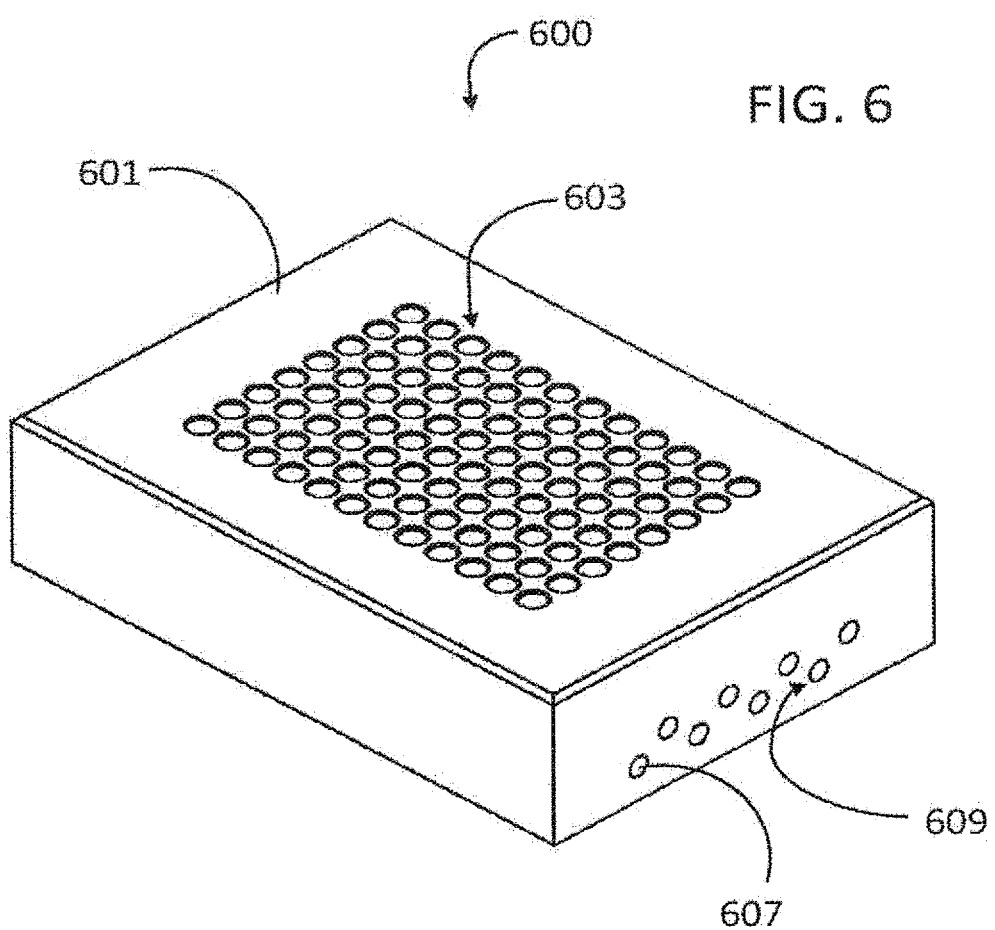
FIG. 6 an exemplary embodiment of a column-based drain block in accordance with various embodiments of the disclosed subject matter.

FIG. 6 an exemplary embodiment of a column-based drain block 600 in accordance with various embodiments of the disclosed subject matter. The column-based drain block 600 facilitates existing columns of column-based synthesis. A block 601 can be machined or otherwise formed with a series of holes 603 wide enough to use and seal typical synthesis columns with, for example, a friction fit (e.g., approximately 6 mm in diameter). The block 601 can be formed from any suitable materials such as metals (e.g., aluminum or stainless steel) or dielectric materials (e.g., aluminum oxide or various types of plastics). The series of holes 603 are, for example, drilled into a common channel 607 that flows to a singular output 609. The singular output 609 drains to a respective waste valve (not shown). The rest of the RIOS remains the same.

Regardless of the draining platform that facilitates the synthesis, the chemistry generally exists in an inert environment, oxygen free, and continues to receive and flush reagents without human intervention. Though the primary method for facilitating this process is described at the beginning of this application, there are additional methods that can be employed. Additional modifications to the various embodiments described above are described below.

Figure 7:
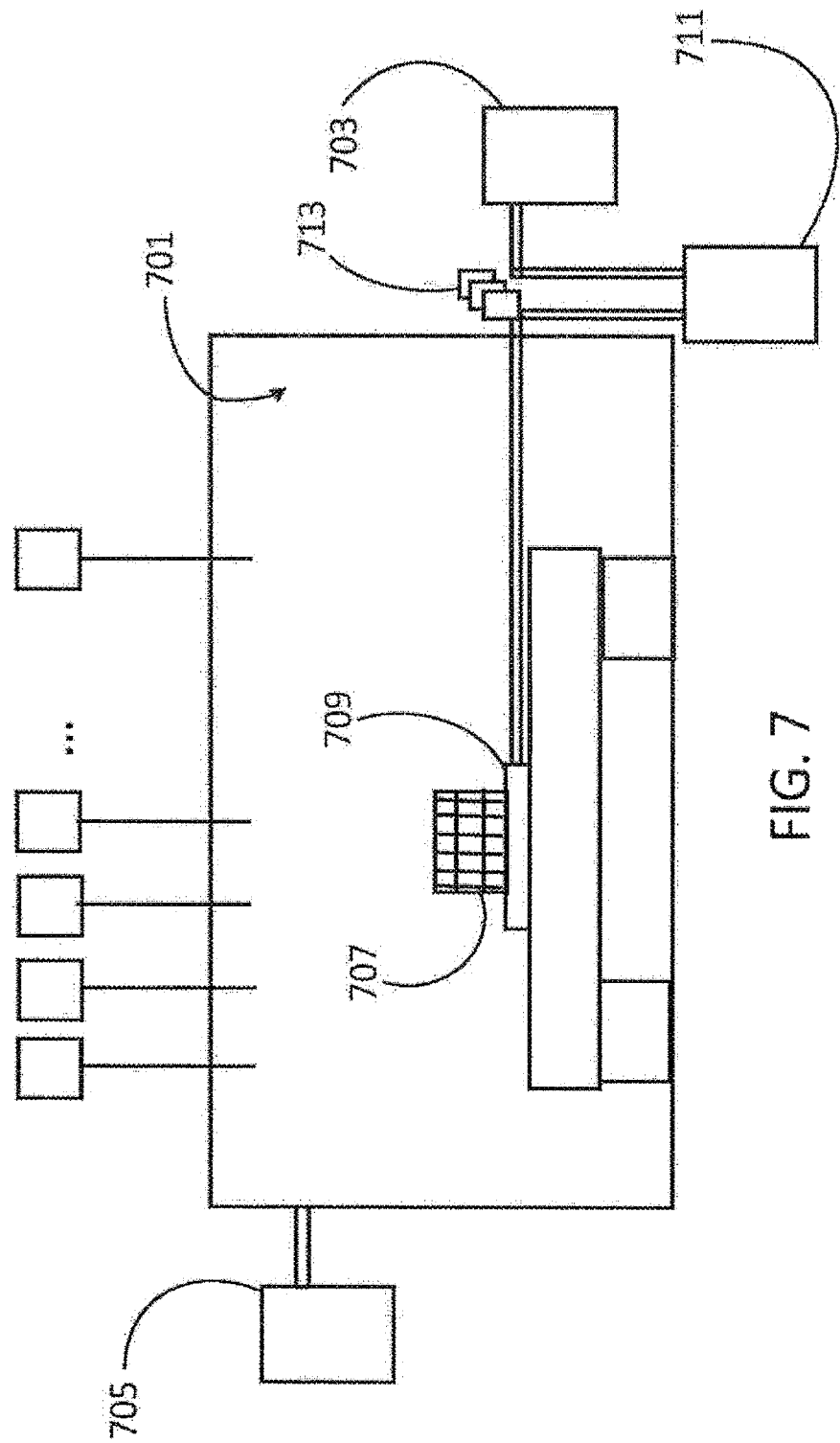
FIG. 7 shows an exemplary embodiment of a gas/fluid pathway for a RIOS system under negative pressure in accordance with various embodiments of the disclosed subject matter.

FIG. 7 shows an exemplary embodiment of a gas/fluid pathway for a RIOS system under negative pressure in accordance with various embodiments of the disclosed subject matter. The chamber 701 in the RIOS system of FIG. 7 could be constructed such that oxygen is not pushed out of, but actively substantially vacuumed from, the chamber 701 with a vacuum pump 703. The negative pressure then created within the chamber 701 could be normalized with incoming gas from a pressurized gas-source 705 suitable for oligonucleotide synthesis. The vacuum pump 703 used to pull gas from the chamber 701 directly would also pull waste from a synthesis plate 707 through a drain block 709, removing used reagents (waste). The vacuum pump 703 may be located downstream from a waste container 711 so that the waste does not ever come into contact with the vacuum pump 703. The negative pressure created within the drain block 709 would be brought back to the ambient pressure of the chamber 701 so as not to allow fresh reagents to fall through the synthesis plate 707 unused. This condition allows drain lines protruding from the drain block 709 to reach an array of corresponding valves 713 where the vacuum pump 703 is located downstream of the array of corresponding valves 713. In an embodiment, the vacuum pump 703 may be accessed individually by each valve via a manifold (not shown) to which all of the array of corresponding valves 713 connect. Normalizing a pressure of the manifold allows for a positive pressure to selectively be distributed back to the drain block 709 so that any recently drained row of the synthesis plate 707 could be brought to a current ambient pressure of the chamber 701.

Figure 8:
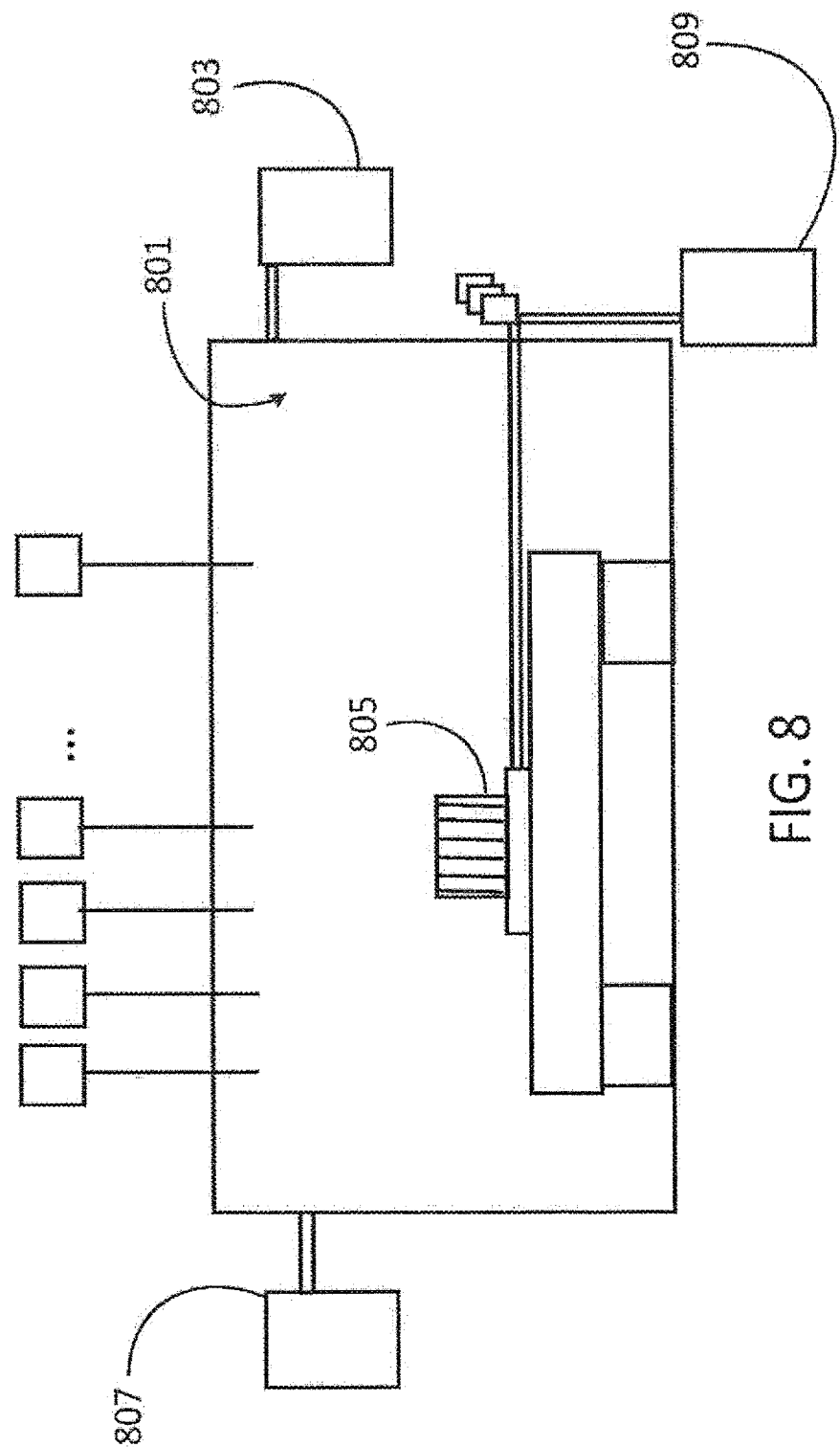
FIG. 8 shows an exemplary embodiment of a gas/fluid pathway for a RIOS system under a hybridization of positive pressure and negative pressure in accordance with various embodiments of the disclosed subject matter.

FIG. 8 shows an exemplary embodiment of a gas/fluid pathway for a RIOS system under a hybridization of positive pressure and negative pressure in accordance with various embodiments of the disclosed subject matter. FIG. 8 therefore shows a combined approach wherein a synthesis chamber 801 is substantially vacuumed of oxygen (or other gas) with a vacuum pump 803 while a synthesis plate 805 experiences positive pressure from an incoming, pressurized gas-source 807. The pressurized gas-source 807 purges waste from the synthesis plate 805 into a waste container 809. Once the synthesis chamber 801 has been vacuumed of one or more corrosive gases and has been pressurized to a desired level of inert gas, the remainder of the RIOS system could remain consistent with other embodiments disclosed herein.

Additional mechanisms designed for an improvement of optimization of fluidic handling are submitted and detailed below.

Figure 9:
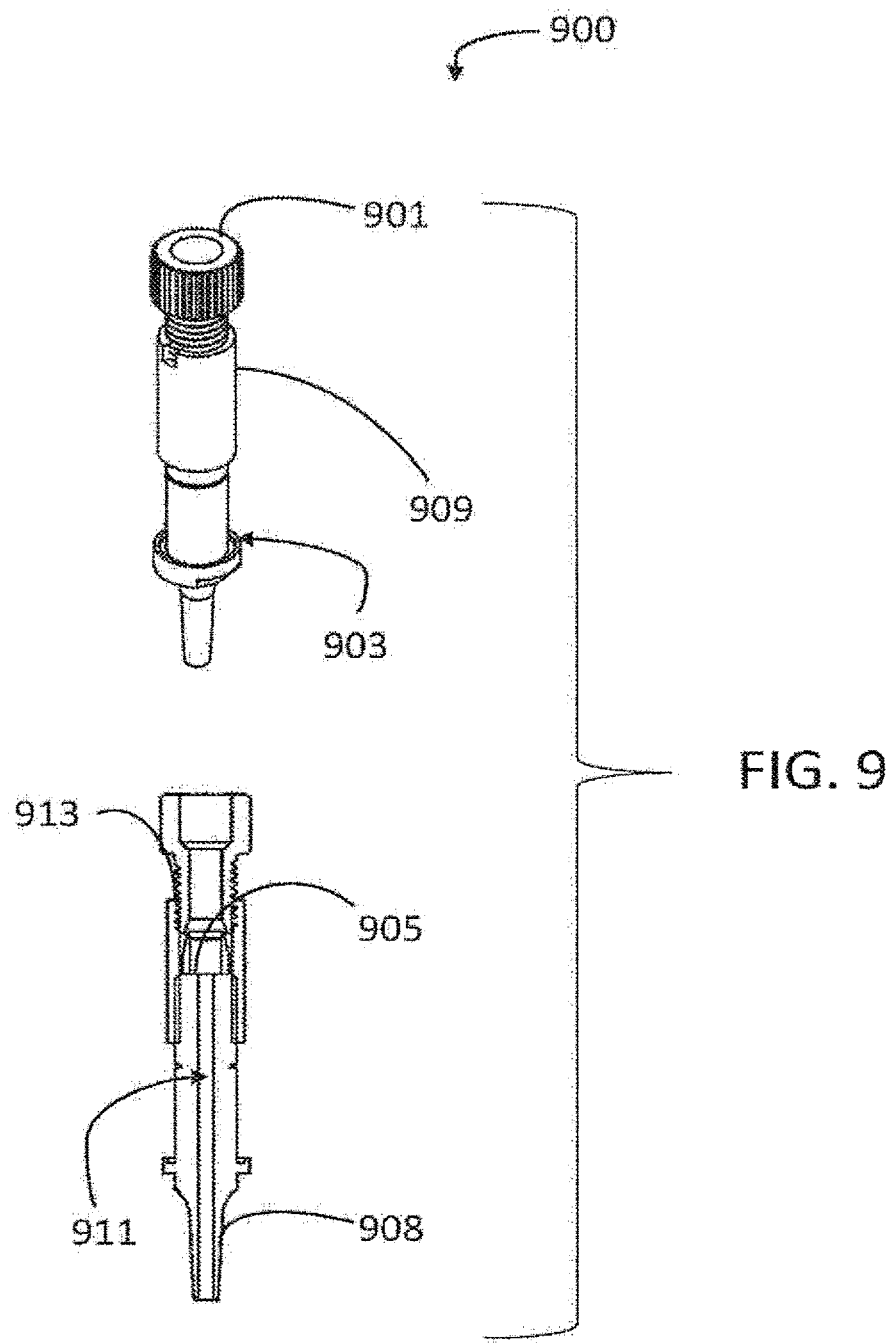
FIG. 9 shows an exemplary embodiment of a dispense-tip assembly in accordance with various embodiments of the disclosed subject matter.

For example, FIG. 9 shows an exemplary embodiment of a dispense-tip assembly 900 in accordance with various embodiments of the disclosed subject matter. For a dispensing one or more chemicals from one of the set of solenoid valves 107 (see FIG. 1) to insert into a chamber 103 without a loss of pressure, flanged fittings 901 have been designed to accept common fluidic lines, for example, having an outside diameter (OD) of about 3.175 mm (approximately 0.125 inches). In a specific exemplary embodiment, various fluidic lines can be fitted with the dispense-tip assembly 900, which can direct the line so as not to allow the fluidic line to dispense in unwanted directions. The dispense-tip assembly 900 may also contain, for example, an imbedded O-ring groove 903 to seal pressure within the chamber and be machined with a flat surface 905 on the receiving end of a dispense nozzle 908 to allow the flanged fitting 901 to press against the flat surface 905 to prevent or reduce leaks along the fluidic path (such fittings are available from, for example, IDEX Corporation, 1925 West Field Court, Suite 200, Lake Forest, Illinois, USA; or Valco Instruments Company Inc., 8300 Waterbury, Houston, Texas, USA).

The flat surface 905 of the dispense-tip assembly 900 has a diameter wide enough to accept, for example, ¼'-28 (or a substantially metric-equivalent) flanged fittings 901. A union 909 connects the receiving end of the dispense nozzle 908 to the flanged fitting with a complementary thread 913. Though the dispense-tip assembly 900 could be designed to accept a flange of any diameter, the ¼"-28 flanged fittings 901 were chosen due to their flexibility in receiving fluidic lines of varying ODs.

A through-hole 911 in the center of the dispense-tip assembly 900 is machined to the OD of the incoming line, in this case, about 3.175 mm (approximately 0.125 inch). No reduction in diameter is needed at any point along the through-hole 911. The flanged fitting 901 seals pressure against the flat surface 905 of the nozzle and allows the remainder of the line to come through the dispense nozzle 908 while leaving a pressure of the chamber 103 (see FIG. 1) pressure constant.

In embodiments, the union 909 may also act as a tightening agent that pulls the dispensing portion of the dispense nozzle 908 (located, for example, inside the chamber 103 of FIG. 1) against the ceiling 117 (also of FIG. 1) from which it protrudes. In this embodiment, the portion of the dispense-tip assembly 900 that snugs against the ceiling 117 may be machined wider than the hole in the ceiling 117. In this example, this wider portion may be machined to seat a small O-ring of about 6.35 mm ID by about 0.792 mm W (approximately 0.250 inch ID×approximately 0.0312 inch W) along its edges. Additionally, a small amount of grease can be applied to this O-ring to improve the seal even further. When dispense-tip assembly 900 is utilized, the reagents can dispense without a need to adjust line direction and without a concern of leaking gas from the chamber 103.

Figure 10:
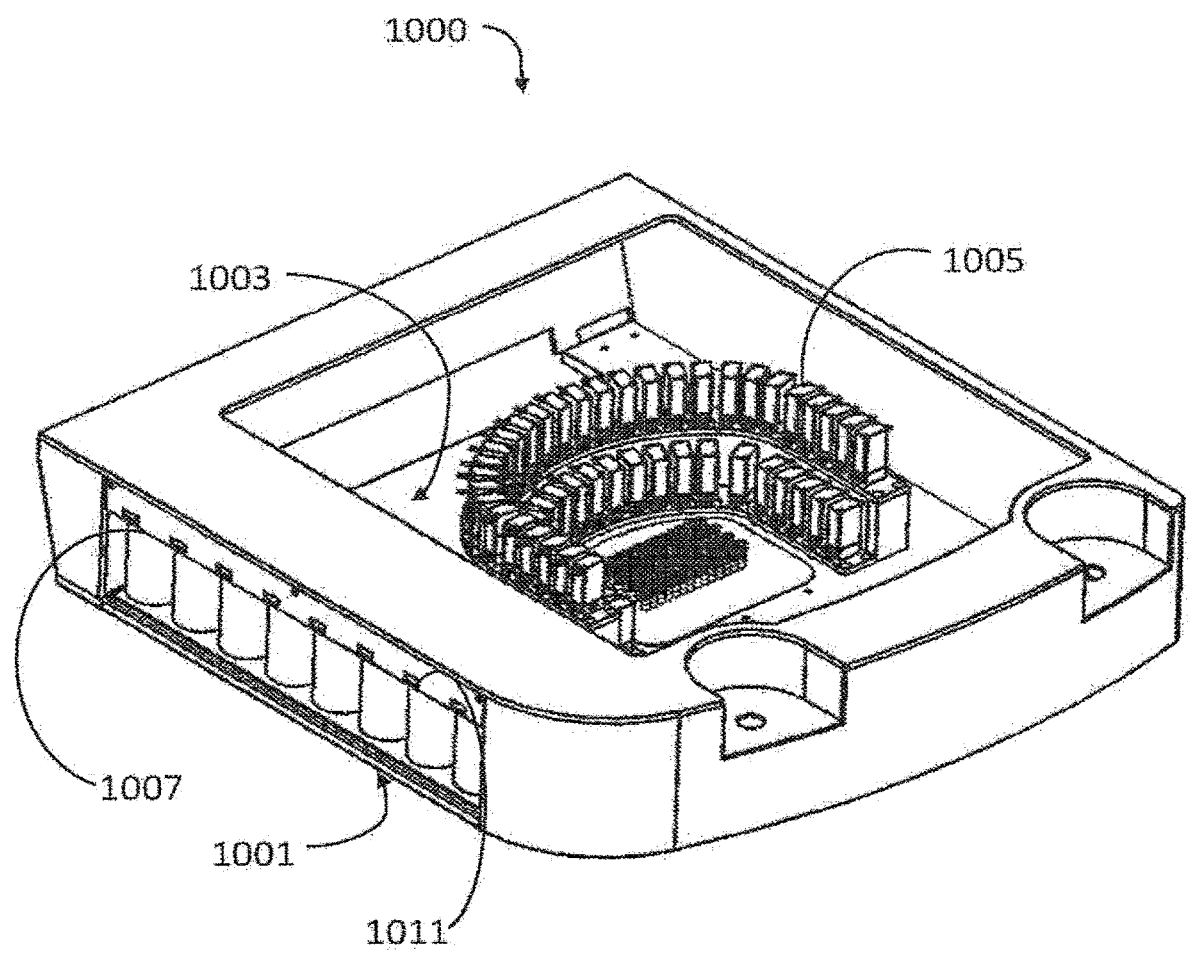
FIG. 10 shows an exemplary embodiment of a lid housing for valve-adjacent reagent bottles in accordance with various embodiments of the disclosed subject matter.

FIG. 10 shows an exemplary embodiment of a lid housing 1000 for valve-adjacent reagent bottles in accordance with various embodiments of the disclosed subject matter. The lid housing 1000 of FIG. 10 may therefore be considered an alternative embodiment of the ceiling 117 of FIG. 1. The lid housing 1000 used to seal the chamber 103 of FIG. 1 (or any of the various other embodiments) is configured to perform multiple functions. For example, the lid housing 1000 serves to seal inert gas inside the chamber 103. The lid housing 1000 is also hinged to allow users access into the chamber 103 for the insertion and collection of synthesis plates. Unlike the ceiling 117 of FIG. 1, the lid housing 1000 of FIG. 10 includes a cavity 1001 to house the bottles 1007 for the synthesis process. The lid housing 1000 further includes an opening 1003 to grant access to a valve array 1005. The valve array 1005 allows dispensing into, for example, each of the individual wells 115 of the synthesis plate 101 (see FIG. 1).

As most amidites used to construct genetic material during synthesis can have high costs, ranging into the thousands of dollars per gram, restricted line lengths and minimal dead volumes may be a significant concern to an end user. Not only are wasted amidites costly to replace, their expiration inside fluidic lines can result in crystallization, leading to an inefficient or blocked dispense. Because the movement of the fluid within the line is generally one-way, the full contents of the line are utilized, sometimes unnecessarily, in order to avoid wasted amidites during and/or after synthesis.

To resolve issues regarding line length, the lid housing 1000 that assist in directing the valve array 1005 into the individual wells 115 of the synthesis plate 101 can be fitted to allow a rack to hold the bottles 1007 be formed on one or more sides of the lid housing 1000. The material (e.g., sheet metal or other suitable material) selected to hold the bottles 1007 in this way may contain, for example, two separate walls (e.g., steel wall dividers) that keep the bottles 1007 from interacting with any of the valves within the valve array 1005, thereby constituting a safety measure to protect the end user should a leak occur. A bottle receptacle 1011 can be used on the rack for the bottles 1007, into which the bottles fit. The bottle receptacle 1011 may push an O-ring or other sealing device against the opening of the bottle so that fluid does not leak from the bottle 1007 when the lid housing 1000 is raised. The O-ring or other sealing device also seals gas within the bottle so that a positive pressure used to displace, for example, the liquid amidite is preserved.

Figure 11:
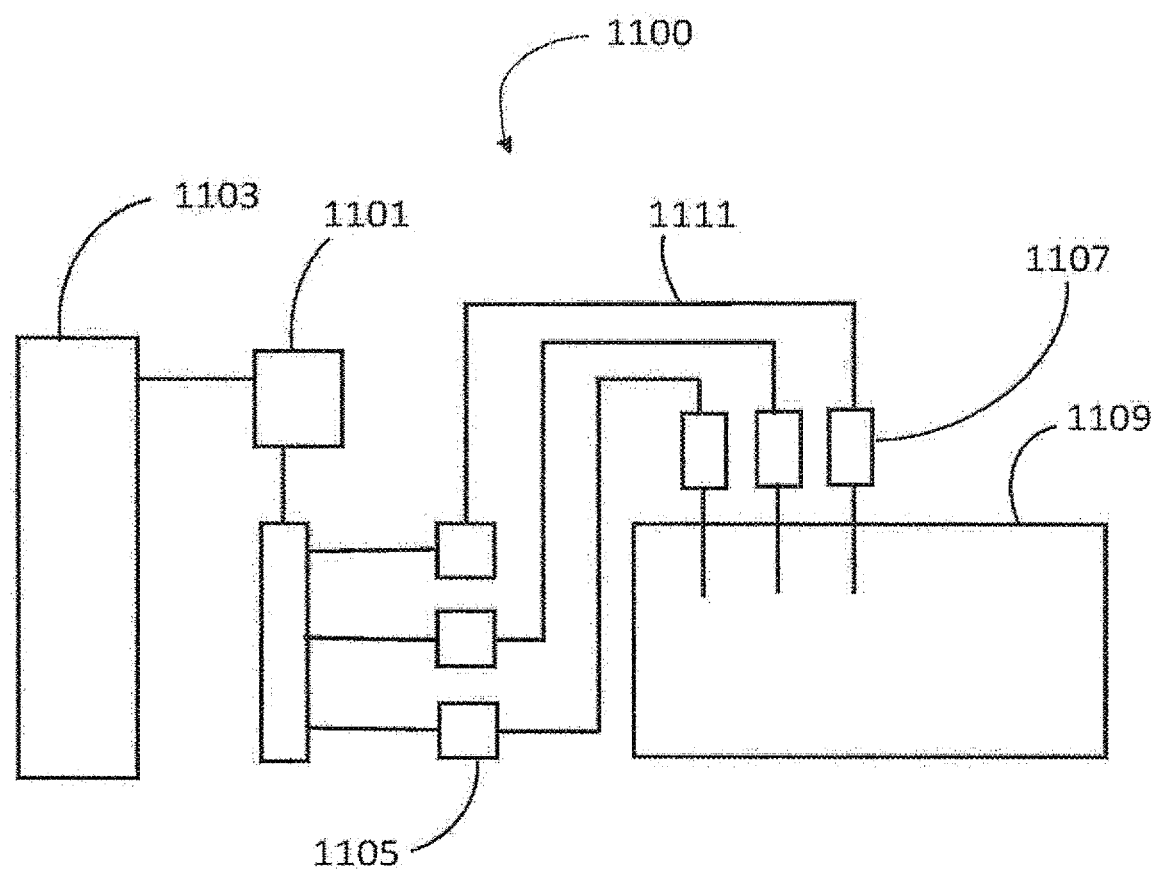
FIG. 11 shows an exemplary embodiment of a reverse-flush pathway in accordance with various embodiments of the disclosed subject matter.

With reference now to FIG. 11, an exemplary embodiment of a reverse-flush pathway 1100 in accordance with various embodiments of the disclosed subject matter is shown. As an additional feature to perform fluid handling, various embodiments of the RIOS system may include an exhaust valve 1101 that is fitted downstream from a pressure source 1103, but before entry into a set of bottles 1105 and an array of solenoid valves 1107. By pressurizing a chamber 1109, to which fluidic lines 1111 lead, and relieving pressure from the set of bottles 1105 from which the fluids originated, existing gas in the chamber 1109 can be used to push excess reagents back to the bottles 1105. The gas flows from the chamber 1109, through the fluidic lines 1111, pushing the liquid into the bottles 1105, and creating a volume with respective ones of the bottles 1105 by way of the exhaust valve 1101 relieving pressure from the bottles 1105. The pressure differential between the chamber 1109 and the bottles 1105 creates a reverse-flush embodiment for the user that would further decrease wasted reagents and/or amidites at the end of each synthesis.

FIG. 12 shows an exemplary embodiment of a calibration apparatus 1200 that may be used with various ones of the embodiments disclosed herein. The calibration apparatus 1200 is designed to calibrate various ones of the solenoid valves disclosed herein (e.g., the solenoid valves 107 of FIG. 1).

The exemplary embodiment of FIG. 12 is shown to include a plate 1203 (e.g., comprising metal or other suitable material) formed with a series of holes 1205 to seat standard tubules 1207 used in polymerase chain reaction (PCR) devices. The series of holes 1205 is formed in sets of, for example, three, with each one of the series of holes 1205 receiving its own tubule 1207 (e.g., a PCR tubule). The tubules 1207 (one per hole 1205 in the set) are used to measure liquids dispensed by a solenoid valve in, for example, three separate increments, such as 50 millisecond, 100 millisecond, and 200 millisecond increments. Contents of the tubule 1207 is now the "dispensed liquid." A weight or volume of the dispensed liquid is measured, an average is taken, with a density of the dispensed liquid being considered, and the result gives an accurate time-to-liquid delivery value.

By employing a simple latching device 1209 that is coupled to, for example, the drain block 201 of FIG. 2A in the same or similar way to how the keeper 217 is coupled to the drain block 201, the calibration apparatus 1200 can be used to calibrate dispensing valves as described above with regard to any of the preceding exemplary embodiments. Upon reading and understanding the disclosed subject matter, a person of ordinary skill in the art will recognize that any amount of dispenses, holes 1205, and tubules 1207 can be used, although increasing the numbers will result in a more robust average. Similarly, dispense times are used as examples only.

Using the unique apparatus along with the additional design elements and methods described, the end user is left with a machine far superior to those existing in today's oligonucleotide synthesis market. The machine allows plate-based synthesis to compete with conventional "column-based" synthesis by shortening cycle times and reducing waste, while creating smaller quantities of oligonucleotides in higher yields and wider varieties at no additional cost.

THE FOLLOWING NUMBERED EXAMPLES
ARE EMBODIMENTS OF THE DISCLOSED
SUBJECT MATTER

Example 1: In an embodiment, the disclosed subject matter includes a pressurized system designed to facilitate the synthesis of oligonucleotides on a synthesis plate with respect to rows using a positive-pressure system, a row-independent oligonucleotide synthesis (RIOS) system.

Example 2: In an embodiment, the disclosed subject matter includes an apparatus used in oligonucleotide synthesis. The apparatus includes a machined block configured to receive a commercially-available synthesis plate, a keeper to apply pressure to the commercially-available synthesis plate, and a sealing element to seal the commercially-available synthesis plate to the machined block.

Example 3: A modified apparatus of either of the two preceding Examples, wherein the keeper and the machined block are configured to be lengthened so as to allow the addition of one or more synthesis plates.

Example 4: The modified apparatus of any one of the preceding examples, wherein the drain block is configured to accept commercially-available synthesis plates and drain each well of the plate individually.

Example 5: The modified apparatus of any one of the preceding examples, wherein the drain block is configured to perform synthesis with commercially-available synthesis columns.

Example 6: In various embodiments, the disclosed subject matter includes an apparatus used in oligonucleotide synthesis. The apparatus includes a chamber configured to facilitate the synthesis of the chemistry within the apparatus via a selection of pressures including a positive pressure and a negative pressure. Example 7: In various embodiments, the disclosed subject matter includes an apparatus used in oligonucleotide synthesis. The apparatus includes a chamber configured to facilitate the synthesis of chemistry within the apparatus via a selection of pressures including a hybridization of both positive pressure and negative pressure.

Example 8: An apparatus of any one of the preceding examples, further comprising machined dispense-tips to be coupled in close proximity to valves installed on a lid of a pressurized chamber, the machined dispense-tips being spaced and aligned to be substantially matched to respective distances of the commercially-available synthesis plate. The machined dispense-tips include a support for a fluidic line, the support comprising at least one of a flange or a ferrule and O-ring.

Example 9: An apparatus of any one of the preceding examples, further comprising a lid sealing the chamber having both bottles and valves proximately coupled to reduce dead volume.

Example 10: An apparatus of any one of the preceding examples, further comprising a valve-to-manifold mechanism to flush at least a portion of residual reagents that accumulate in the fluidic lines post-synthesis back to their respective points-of-origin.

Example 11: An apparatus of any one of the preceding examples, further comprising a machined plate designed to fit and latch onto the existing drain for calibration of solenoid valves in a RIOS system.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the term "or" may be construed in an inclusive or exclusive sense. Further, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various combinations.

Although various embodiments are discussed separately, these separate embodiments are not intended to be considered as independent techniques or designs. As indicated above, each of the various portions may be inter-related and each may be used separately or in combination with other embodiments. For example, although various embodiments of methods, operations, and processes have been described, these methods, operations, and processes may be used either separately or in various combinations.

Consequently, many modifications and variations can be made, as will be apparent to a person of ordinary skill in the art upon reading and understanding the disclosure provided herein. Functionally equivalent methods and devices within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. An apparatus comprising:
a chamber, the chamber under an interior pressure;
two or more synthesis plates inside the chamber, each of the two or more synthesis plates having a plurality of rows, each row of the plurality of rows comprising a plurality of wells and each well of the plurality of wells comprising a waste tip on a bottom of the each of the two or more synthesis plates;
a drain block located beneath the two or more synthesis plates;
a keeper located on top of the two or more synthesis plates, the keeper fastened to the drain block by mechanical fasteners, the mechanical fasteners applying pressure to the two or more synthesis plates, thereby forming a seal around each of the plurality of rows and each of the plurality of wells of the two or more synthesis plates;
a gas source operably coupled to the chamber via one or more tubes; and
a plurality of solenoid valves, the plurality of solenoid valves dispensing reagents to the plurality of wells of the two or more synthesis plates.

2. The apparatus of claim 1, further comprising a movement stage, the movement stage moving the two or more synthesis plates under the plurality of solenoid valves.

3. The apparatus of claim 1, where the interior pressure is a positive pressure.

4. The apparatus of claim 1, further comprising a plurality of waste solenoid valves, each of the plurality of waste solenoid valves operably coupled to one or more rows of the two or more synthesis plates.

5. The apparatus of claim 1, further comprising a vacuum pump operably connected to the chamber via one or more tubes.

6. The apparatus of claim 5, where the interior pressure is a negative pressure.

7. The apparatus of claim 5, where the interior pressure is a hybridization of a positive pressure and a negative pressure.

8. The apparatus of claim 1, further comprising a dispense-tip assembly.

9. An apparatus comprising:
  a chamber, the chamber under an interior pressure;
  two or more synthesis plates inside the chamber, each of the two or more synthesis plates having a plurality of rows, each row of the plurality of rows comprising a plurality of wells and each well of the plurality of wells comprising a waste tip on a bottom of the each of the two or more synthesis plates;
  a drain block located beneath the two or more synthesis plates;
  a keeper located on top of the two or more synthesis plates, the keeper fastened to the drain block by mechanical fasteners, the mechanical fasteners applying pressure to the two or more synthesis plates, thereby forming a seal around each of the plurality of rows and each of the plurality of wells of the two or more synthesis plates;
  a gas source operably coupled to the chamber via one or more tubes; and
  a plurality of solenoid valves, the plurality of solenoid valves dispensing reagents through a ceiling of the chamber to the plurality of wells of the two or more synthesis plates.

10. The apparatus of claim 9, further comprising a plurality of waste solenoid valves, each of the plurality of waste solenoid valves operably coupled to one or more rows of the two or more synthesis plates.

11. The apparatus of claim 9, wherein the interior pressure is a positive pressure.

12. The apparatus of claim 9, further comprising a vacuum pump operably connected to the chamber via one or more tubes.

13. The apparatus of claim 12, wherein the interior pressure is a negative pressure.

14. The apparatus of claim 12, wherein the interior pressure is a hybridization of a positive pressure and a negative pressure.

15. The apparatus of claim 9, further comprising further comprising a dispense-tip assembly, including a dispense nozzle.

16. The apparatus of claim 15, where the dispense nozzle is inside of the chamber against the ceiling.

17. An apparatus comprising:
  a chamber comprising a lid;
  two or more synthesis plates inside the chamber, each of the two or more synthesis plates having a plurality of rows, each row of the plurality of rows comprising a plurality of wells and each well of the plurality of wells comprising a waste tip on a bottom of the each of the two or more synthesis plates;
  a drain block located beneath the two or more synthesis plates;
  a keeper located on top of the two or more synthesis plates, the keeper fastened to the drain block by mechanical fasteners, the mechanical fasteners applying pressure to the two or more synthesis plates, thereby forming a seal around each of the plurality of rows and each of the plurality of wells of the two or more synthesis plates; and
  a gas source operably coupled to the chamber via one or more tubes, the gas source creating a pressure inside the chamber.

18. The apparatus of claim 17, where the lid comprises a cavity with a plurality of bottles containing reagents inside the cavity.

19. The apparatus of claim 18, further comprising an opening in the lid, the opening containing a valve array, the valve array dispensing the reagents from the plurality of bottles to the plurality of wells of the two or more synthesis plates.

20. The apparatus of claim 17, further comprising a plurality of waste solenoid valves, each of the plurality of waste solenoid valves operably coupled to one or more rows of the two or more synthesis plates.

\* \* \* \* \*